(12) United States Patent
Adachi

(10) Patent No.: US 8,114,366 B2
(45) Date of Patent: Feb. 14, 2012

(54) PROCESS FOR CONTINUOUS PRODUCTION OF FIBROUS BASIC MAGNESIUM SULFATE PARTICLE

(75) Inventor: Toru Adachi, Yamaguchi (JP)

(73) Assignee: Ube Material Industries, Ltd., Ube-shi, Yamaguchi (JP)

( * ) Notice: Subject to any disclaimer, the term of this patent is extended or adjusted under 35 U.S.C. 154(b) by 0 days.

(21) Appl. No.: 12/934,714

(22) PCT Filed: Mar. 27, 2009

(86) PCT No.: PCT/JP2009/056307
§ 371 (c)(1),
(2), (4) Date: Sep. 27, 2010

(87) PCT Pub. No.: WO2009/119814
PCT Pub. Date: Oct. 1, 2009

(65) Prior Publication Data
US 2011/0014116 A1    Jan. 20, 2011

(30) Foreign Application Priority Data
Mar. 28, 2008   (JP) ................................. 2008-087441

(51) Int. Cl.
*C01F 5/40* (2006.01)
(52) U.S. Cl. ........................................ 423/166; 423/554
(58) Field of Classification Search .................. 423/166, 423/554
See application file for complete search history.

(56) References Cited

U.S. PATENT DOCUMENTS

| | | | | |
|---|---|---|---|---|
| 5,021,226 A | * | 6/1991 | Ueno et al. .................... | 423/554 |
| 5,082,646 A | * | 1/1992 | Ueno et al. .................... | 423/554 |
| 5,326,548 A | * | 7/1994 | Otaka et al. ................... | 423/554 |

FOREIGN PATENT DOCUMENTS

| | | |
|---|---|---|
| JP | 56-149318 | 11/1981 |
| JP | 03-122012 | 5/1991 |
| JP | 03-122013 | 5/1991 |
| JP | 04-074709 | 3/1992 |
| JP | 04-317406 | 11/1992 |
| JP | 2005-231927 | 9/2005 |
| JP | 2007-161954 | 6/2007 |

OTHER PUBLICATIONS

International Search Report dated May 12, 2009, Application No. PCT/JP2009/056307.

Yue Tae et al., "Crystal growth and crystal structure of magnesium oxysulfate $2MgSO_4 \cdot Mg(OH)_2 \cdot 2H_2O$", Journal of Molecular Structure, 2002, vol. 616, pp. 247-252.

* cited by examiner

*Primary Examiner* — Timothy Vanoy
(74) *Attorney, Agent, or Firm* — Nixon Peabody LLP; Jeffrey L. Costellia

(57) ABSTRACT

Fibrous basic magnesium sulfate particles are continuously produced by the process comprising the following steps: (1) placing in a reaction vessel a seed particle-containing aqueous dispersion comprising fibrous basic magnesium sulfate seed particles dispersed in an aqueous medium; (2) supplying magnesium hydroxide and magnesium sulfate continuously into the reaction vessel under heating and stirring the seed particle-containing aqueous dispersion, whereby depositing basic magnesium sulfate produced by the reaction between the magnesium sulfate and magnesium hydroxide in the presence of water on the surfaces of the fibrous basic magnesium sulfate seed particles, to give an aqueous dispersion containing an increased amount of fibrous basic magnesium sulfate particles; (3) taking the aqueous dispersion obtained in the step (2) continuously out of the reaction vessel; and (4) recovering fibrous basic magnesium sulfate particles from the aqueous dispersion taken out of the reaction vessel.

9 Claims, 1 Drawing Sheet

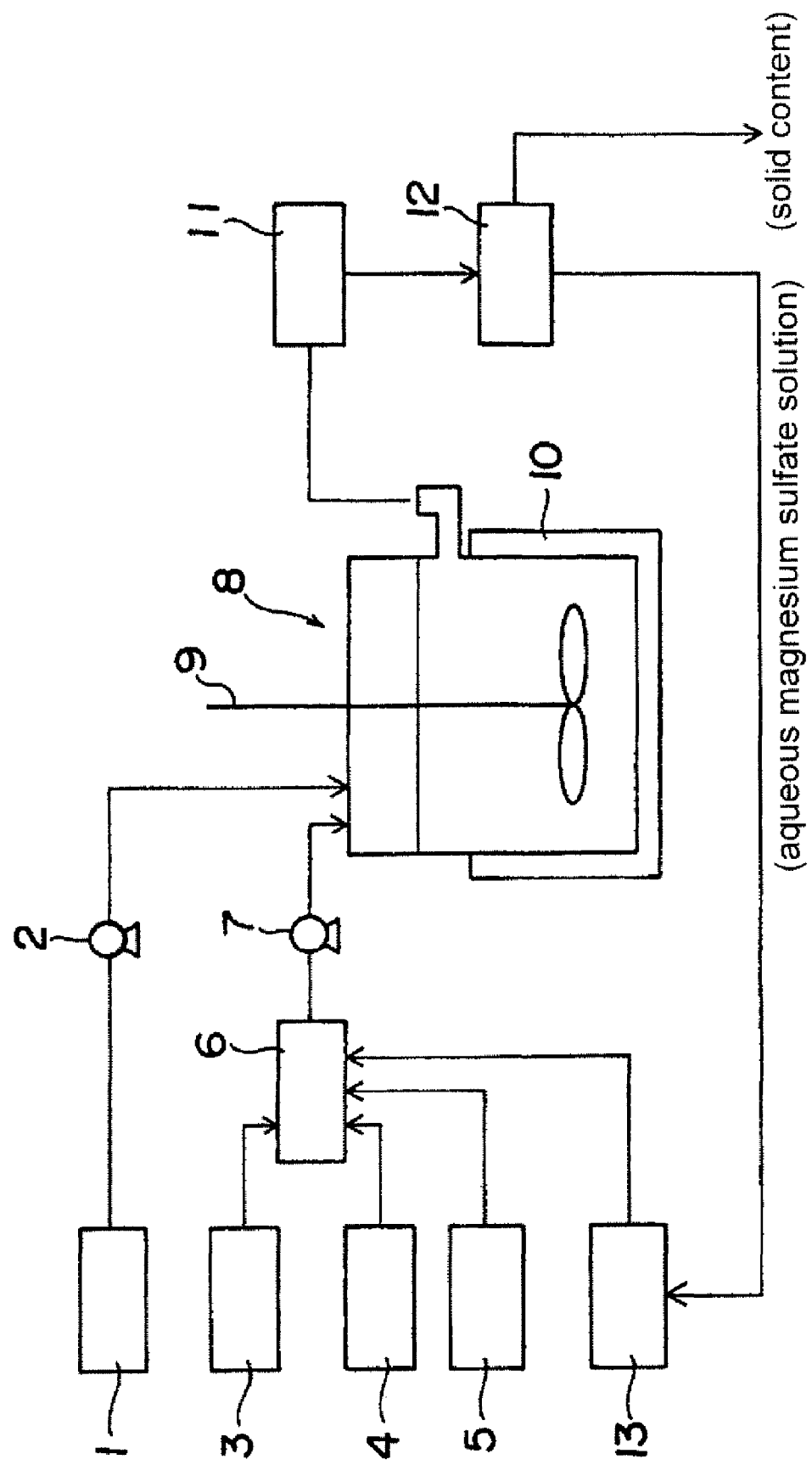

PROCESS FOR CONTINUOUS PRODUCTION OF FIBROUS BASIC MAGNESIUM SULFATE PARTICLE

FIELD OF THE INVENTION

The present invention relates to a process for producing continuously fibrous basic magnesium sulfate particles.

BACKGROUND OF THE INVENTION

The particles of fibrous basic magnesium sulfate [$MgSO_4 \cdot 5Mg(OH)_2 \cdot 3H_2O$] are utilized as reinforcing material for paper, resin and rubber, or raw material for manufacturing filters. There have been known the following preparation processes for producing the fibrous basic magnesium sulfate particles.

JP-A-56-149318 (Patent publication 1) describes a process for producing fibrous basic magnesium sulfate particles by hydrothermal reaction. In more detail, the publication discloses a process comprising the steps of dispersing magnesium hydroxide or magnesium oxide in an aqueous magnesium sulfate in an amount of 25 wt. % or less and subjecting the dispersion to hydrothermal reaction at a temperature of 100 to 300° C., preferably 120 to 300° C.

JP-A-3-122012 (Patent publication 2) discloses a process for producing fibrous basic magnesium sulfate particles utilizing no hydrothermal reaction. In more detail, the process comprises the steps of heating an aqueous dispersion which is prepared by dispersing a magnesium oxide powder in an aqueous sulfate-containing solution preferably at an ordinary pressure and a temperature of 60° C. or higher, but lower than the boiling point, to produce a massive basic magnesium sulfate, and disintegrating the massive product under strong shearing force.

It is required to utilize a pressure-resistant vessel such as autoclave for performing the process for producing fibrous basic magnesium sulfate particles by hydrothermal reaction (which is disclosed in Patent publication 1). Therefore, it is difficult to continuously produce the fibrous basic magnesium sulfate particles.

The process of Patent publication 2 is advantageous in the non-use of hydrothermal reaction. However, it is required to perform an additional step for disintegrating the massive basic magnesium sulfate.

SUMMARY OF THE INVENTION

Accordingly, it is an object of the present invention to provide a process for producing continuously fibrous basic magnesium sulfate particles.

The present inventors have found that when magnesium sulfate and magnesium hydroxide are supplied into a heated fibrous basic magnesium sulfate seed particle-containing aqueous dispersion under stirring, the fibrous basic magnesium sulfate particles grow in the aqueous dispersion. In more detail, basic magnesium sulfate produced by the reaction between the magnesium sulfate and magnesium hydroxide in the presence of water deposits on surfaces (particular end faces) of the seed particles, so that the seed particles grow in the longitudinal direction.

Moreover, the inventors have confirmed that fibrous basic magnesium sulfate particles can be continuously produced by providing in a reaction vessel a seed particle-containing aqueous dispersion comprising fibrous basic magnesium sulfate seed particles dispersed in an aqueous medium; supplying magnesium hydroxide and magnesium sulfate continuously into the reaction vessel under heating and stirring the seed particle-containing aqueous dispersion, whereby depositing basic magnesium sulfate produced by the reaction between the magnesium sulfate and magnesium hydroxide in the presence of water on the surfaces of the fibrous basic magnesium sulfate seed particles, to give an aqueous dispersion containing an increased amount of fibrous basic magnesium sulfate particles; taking the resulting aqueous dispersion continuously out of the reaction vessel; and recovering fibrous basic magnesium sulfate particles from the reaction mixture.

Accordingly, the present invention resides in the process for producing continuously fibrous basic magnesium particles which comprises the steps of:

(1) providing in a reaction vessel a seed particle-containing aqueous dispersion comprising fibrous basic magnesium sulfate seed particles dispersed in an aqueous medium;

(2) supplying magnesium hydroxide and magnesium sulfate continuously into the reaction vessel under heating and stirring the seed particle-containing aqueous dispersion, whereby depositing basic magnesium sulfate produced by the reaction between the magnesium sulfate and magnesium hydroxide in the presence of water on the surfaces of the fibrous basic magnesium sulfate seed particles, to give an aqueous dispersion containing an increased amount of fibrous basic magnesium sulfate particles;

(3) taking the aqueous dispersion obtained in the step (2) continuously out of the reaction vessel; and (4) recovering fibrous basic magnesium sulfate particles from the aqueous dispersion taken out of the reaction vessel.

Preferred embodiments of the invention are described below.

1) The aqueous medium of the seed particle-containing aqueous dispersion used in the step (1) is an aqueous magnesium sulfate solution containing 1 to 40 wt. % of magnesium sulfate.

2) The fibrous basic magnesium seed particles used in the step (1) have a mean thickness in the range of 0.1 to 1.0 μm and a mean length in the range of 8 to 30 μm.

3) The magnesium hydroxide supplied into the reaction vessel in the step (2) is in the form of particles having a mean particle size in the range of 0.01 to 100 μm.

4) The magnesium hydroxide particles are supplied in the step (2) under such conditions that the amount of the magnesium hydroxide particles in the aqueous dispersion is kept in the range of 0.05 to 20 wt. % based on the total amount of the magnesium hydroxide particles and fibrous basic magnesium sulfate particles in the aqueous dispersion.

5) The magnesium sulfate is supplied into the reaction vessel in the step (2) in the form of an aqueous solution containing 1 to 40 wt. % of magnesium sulfate.

6) The magnesium hydroxide and magnesium sulfate are supplied into the reaction vessel in the step (2) in such condition that the magnesium sulfate is supplied in an amount of 0.2 to 100 mols, per one mol of the magnesium hydroxide.

7) The seed particle-containing aqueous dispersion is heated in the step (2) at a temperature not lower than 90° C.

8) A liquid portion obtained by the recovery of the fibrous basic magnesium sulfate particles from the aqueous dispersion in the step (4) is supplied into the seed particle-containing aqueous dispersion used in the step (1).

EFFECTS OF THE INVENTION

The process of the invention makes it possible to produce fibrous basic sulfate magnesium particles advantageously in industry.

PREFERRED EMBODIMENTS OF THE INVENTION

In the process of the invention, a seed particle-containing aqueous dispersion comprising fibrous basic magnesium sulfate seed particles dispersed in an aqueous medium is prepared in a reaction vessel, and subsequently magnesium hydroxide and magnesium sulfate are supplied continuously into the reaction vessel under heating and stirring the seed particle-containing aqueous dispersion, whereby depositing basic magnesium sulfate produced by the reaction between the magnesium sulfate and magnesium hydroxide in the presence of water on the surfaces of the fibrous basic magnesium sulfate seed particles. The seed particle-containing aqueous dispersion is heated to preferably 90° C. or higher, more preferably a temperature of not lower than 95° C. but lower than the boiling point of the aqueous dispersion.

The fibrous basic magnesium sulfate seed particles preferably have a mean thickness in the range of 0.1 to 1.0 μm and a mean length in the range of 8 to 30 μm. The seed particles can be prepared by subjecting magnesium sulfate and magnesium hydroxide or magnesium oxide to hydrothermal reaction.

The aqueous medium of the seed particle-containing dispersion preferably is an aqueous magnesium sulfate solution having a concentration of 1 to 40 wt. %.

In the seed particle-containing dispersion, the fibrous basic magnesium sulfate particles are present in an amount of 0.5 to 10 wt. %.

The magnesium hydroxide and magnesium sulfate which are continuously supplied into the reaction vessel for producing fibrous basic magnesium sulfate particles preferably are in a theoretical ratio or more for converting the magnesium sulfate into the basic magnesium sulfate, namely, 0.2 mols or more of magnesium sulfate per one mol of magnesium hydroxide. The magnesium sulfate is used preferably in an amount of 0.2 to 100 mols, more preferably in an amount of 0.2 to 10 mols, per one mol of magnesium hydroxide.

The magnesium sulfate is supplied into the reaction vessel preferably in the form of an aqueous solution or a powder. More preferably, the magnesium sulfate is supplied in the form of an aqueous solution. The aqueous magnesium sulfate solution preferably has a concentration in the range of 1 to 40 wt. %.

The magnesium hydroxide to be supplied into the reaction vessel preferably is in the form of particles having a mean particle size in the range of 0.01 to 100 μm, preferably in the range of 0.1 to 10 μm. The magnesium hydroxide can be supplied in the form of a powder or an aqueous dispersion. The aqueous dispersion is preferred.

The magnesium hydroxide and magnesium sulfate can be supplied into the reaction vessel independently or in the form of a mixture thereof. Otherwise, magnesium hydroxide particles can be dispersed in an aqueous magnesium sulfate solution and then supplied into the reaction vessel.

If magnesium hydroxide is supplied in the form of particles, the magnesium hydroxide particles are supplied into the reaction vessel under such conditions that the content of the magnesium hydroxide particles in the aqueous dispersion contained in the reaction vessel is kept to that preferably in the range of 0.05 to 20 wt. %, more preferably in the range of 1 to 10 wt. %, most preferably in the range of 1 to 5 wt. %, based on the total amount of the solid contents (total amount of the fibrous basic magnesium sulfate particles and magnesium hydroxide particles). For instance, it is preferred that the amount of magnesium hydroxide particles in the solid contents of the aqueous dispersion is determined at appropriate times and the amount of the magnesium hydroxide particle supply is adjusted.

The amount (in terms of wt. %) of the magnesium hydroxide particles in the solid contents of the aqueous dispersion can be determined by the manner described below.

1) The aqueous dispersion is filtered to collect solid contents, which are then washed and dried to give a dry sample.

2) The dry sample in an amount of 0.4 to 0.5 g is placed in a conical beaker and precisely weighed to determine the weight "s" in terms of gram.

3) Two or three drops of an indicator (Methyl orange) is added to the dry sample, and subsequently $1/10$ N hydrochloric acid is dropwise added to the sample until the sample is completely dissolved in the hydrochloric acid. The amount of dropped hydrochloric acid is recorded as "a" in terms of mL.

4) Subsequently, $1/10$ N aqueous sodium hydroxide solution is added to the hydrochloric solution (i.e., back titration) until the hydrochloric solution gives orange-yellow color (end point). The amount of the aqueous sodium hydroxide solution used for the back titration is recorded as "b" in terms of mL.

5) The amount (Z) of titration for the sample is calculated by the following equation: $Z=(a-b)/s$.

6) The magnesium hydroxide particles (starting materials) are processed in the same manner as described in the steps 2) through 5) to give the amount (X) of titration.

7) The fibrous basic magnesium sulfate-containing seed particles are processed in the same manner as described in the steps 2) through 5) to give the amount (Y) of titration.

8) The amount of magnesium hydroxide particles in the solid contents is calculated according to the following equation:

$$\text{Amount of magnesium hydroxide particles (wt. \%)} = (Z-Y)/(X-Y) \times 100$$

When magnesium hydroxide and magnesium sulfate are continuously supplied into the seed particle-containing aqueous dispersion, basic magnesium sulfate produced by the reaction of magnesium sulfate and magnesium hydroxide in the presence of water deposits on the surfaces of the seed particles, whereby an aqueous dispersion in which fibrous basic magnesium sulfate particles of an increased amount are dispersed is obtained. The basic magnesium sulfate produced by the reaction of magnesium sulfate and magnesium hydroxide in the presence of water deposits mainly on both ends of the seed particles, whereby the seed particles grow in the longitudinal direction. The seed particles having grown in the longitudinal direction, however, are easily broken in the course of stirring. Therefore, the fibrous basic magnesium sulfate particles present in the aqueous dispersion have a mean thickness in the range of 0.1 to 1.0 μm and a mean length in the range of 8 to 30 μm.

In the process of the invention, the aqueous dispersion containing an increased amount of fibrous basic magnesium sulfate particles is continuously taken out of the reaction vessel, and the fibrous basic magnesium sulfate particles are then recovered from the taken-out aqueous dispersion.

The recovery of the fibrous basic magnesium sulfate particles can be performed by known solid-liquid isolation methods such as filtration, decantation and centrifugal separation. The liquid portion obtained by the recovery of the fibrous basic magnesium sulfate particles contains magnesium sulfate dissolved therein and hence can be recycled as the aqueous magnesium sulfate solution.

The process of the invention for producing fibrous basic magnesium sulfate particles is further described by referring to the attached drawings.

FIG. 1(FIGURE) illustrates an apparatus for performing the process of the invention for preparing fibrous basic magnesium sulfate particles and for recycling the aqueous magnesium sulfate solution yielded in the course of performing the above-mentioned process.

In FIG. 1, a seed particle-containing aqueous dispersion stored in a tank 1 for storing the seed particle-containing aqueous dispersion is transferred into a reaction vessel 8 by a pump 2. The reaction vessel 8 is equipped with a stirrer 9 and a heating jacket 10. The seed particle-containing dispersion placed in the reaction vessel is heated under stirring.

Independently, magnesium hydroxide particles stored in a tank 3 for storing magnesium hydroxide, an aqueous magnesium sulfate solution stored in a tank 4 for storing an aqueous magnesium sulfate solution, and water stored in a tank 5 for storing water are transmitted in the predetermined amounts into a blending tank 6 and mixed uniformly to give an aqueous magnesium sulfate solution containing magnesium hydroxide particles. The aqueous magnesium sulfate dispersion is then transmitted continuously into the reaction vessel 8 via a volumetric feeding pump 7.

In the reaction vessel 8, magnesium sulfate reacts with magnesium hydroxide in the presence of water to produce basic magnesium sulfate. The produced basic magnesium sulfate deposits on the seed particles to give an increased amount of fibrous basic magnesium sulfate particles in the aqueous dispersion. The aqueous dispersion is then taken out continuously and once stored in a tank 11 for storing reaction mixture and subsequently trans-mitted into a solid-liquid separating apparatus 12. In the solid-liquid separating apparatus 12, the aqueous dispersion is subjected to separation of the solid content from the liquid portion.

The solid content mainly comprising fibrous basic magnesium sulfate particles is purified by the steps of washing and drying. The thus obtained fibrous basic magnesium sulfate particles can be utilized as reinforcing material for paper, resin and rubber, or as filter-manufacturing material.

The liquid portion (aqueous magnesium sulfate solution) recovered in the solid-liquid separating apparatus 12 is transmitted into a tank 13 for storing a recovered aqueous magnesium sulfate solution and once stored therein. Subsequently, the liquid portion is supplied into the blending tank 6 for serving as a magnesium sulfate source. In the blending tank 6, the liquid portion is blended with an aqueous magnesium sulfate solution and magnesium hydroxide particles, and the resulting aqueous magnesium sulfate solution containing magnesium hydroxide particles is transmitted into the reaction vessel 8. It is noted that the liquid portion recovered in the solid-liquid separating apparatus 12 generally has a magnesium sulfate concentration higher than that of the aqueous dispersion in the reaction vessel 8, due to evaporation of the solvent (water).

EXAMPLES

Example 1

Fibrous basic magnesium sulfate particles were produced in the apparatus illustrated in FIG. 1 in the manner described below.

(1) In the tank for storing a seed particle-containing dispersion, the seed particle-containing dispersion prepared in the following manner was placed.

In a 2 L-volume beaker were placed 1032.0 g of water and 715.6 g of magnesium sulfate hepta-hydrate. Magnesium sulfate hepta-hydrate was dissolved in water to give 1747.6 g of an aqueous magnesium sulfate solution having 20.0 wt. % concentration. The aqueous magnesium sulfate solution was stirred, and to the stirred solution was added 52.4 g of fibrous basic magnesium sulfate particles (mean thickness: 0.5 mean length: 15.8 μm). There was obtained 1800 g (approx. 1.5 L) of a seed particle-containing aqueous dispersion having a magnesium sulfate concentration of 19.4 wt. % and a fibrous basic magnesium sulfate particle concentration of 2.9 wt. %.

(2) A magnesium hydroxide particle (mean particle size: 3.0 μm)-containing aqueous dispersion having a concentration of 35.9 wt. % was placed in the tank 3 for storing magnesium hydroxide.

(3) An aqueous magnesium sulfate solution having a concentration of 21.3 wt. % was placed in the tank 4 for storing aqueous magnesium sulfate.

(4) Water was placed in the tank 5 for storing water.

(5) 408.6 g of the aqueous magnesium sulfate solution stored in the tank 4 was transmitted into the blending tank 6. The aqueous magnesium sulfate solution was stirred in the tank, and into the stirred solution was supplied 24 g of the aqueous magnesium hydroxide particle-containing dispersion from the tank 3, to prepare 432.6 g of an aqueous magnesium sulfate dispersion having a magnesium sulfate concentration of 20.1 wt. % and a magnesium hydroxide particle content of 2.0 wt. %. In the course of preparation of the fibrous basic magnesium sulfate particles, into the blending tank 6 were continuously supplied the aqueous magnesium sulfate solution from the tank 4 at a feed rate of 408.6 g/hr., and the aqueous magnesium hydroxide particle-containing dispersion from the tank 3 at a feed rate of 24 g/hr.

(6) A whole amount of the seed particle-containing aqueous dispersion stored in tank 1 was supplied into a reaction vessel 8 (inner volume: 1.5 L) by the pump 2. Subsequently, the seed particle-containing aqueous dispersion in the reaction vessel 8 was stirred by a stirrer 9 at a stirring rate of 250 rpm and heated by means of the heating jacket 10. After the temperature of the seed particle-containing dispersion reached 100° C., the stirring was continued keeping the temperature. In the course of heating the dispersion under stirring, the aqueous magnesium sulfate solution containing magnesium hydroxide particles which was stored in the blending tank 6 was continuously supplied into the reaction vessel 8 at a feed rate of 433 g/hr (at a magnesium hydroxide feed rate of 8.6 g/hr) by means of the volumetric feed pump 7. An aqueous dispersion overflowing by the continuous supply of the aqueous magnesium sulfate solution in which magnesium hydroxide particles were dispersed was taken out of the reaction vessel through its outlet and once stored in a tank 11 for storing reaction product. The aqueous dispersion was then transmitted into the solid-liquid separating apparatus 12 (suction filtering apparatus) and subjected to solid-liquid separation.

The solid portion separated in the solid-liquid separating apparatus 12 was washed with water in a washing apparatus and dried in a dryer. The filtrate (aqueous magnesium sulfate solution) was stored in a tank 13 for a recovered aqueous magnesium sulfate solution.

The supply of the aqueous magnesium sulfate solution in which magnesium hydroxide particles were dispersed from the blending tank 6 was continued for 10 hours. In the course of the supply, the aqueous dispersion in the reaction vessel 8 was sampled every one hour to determine the amount of the magnesium hydroxide particles in the solid content of the aqueous dispersion. It was confirmed that the amount of magnesium hydroxide particles in the solid content was kept at a level of lower than 4 wt. % per the amount of the solid content.

The resulting solid content was subjected to measurement of X-ray diffraction pattern and observation of particle shape by electron microscope. The X-ray diffraction pattern indicated that the solid content comprised basic magnesium sulfate. The electron microscopic observation indicated that the basic magnesium sulfate was in the form of fibrous particles having a mean thickness of 0.4 μm and a mean length of 19.9 μm. It was also confirmed that the solid content contained 1.5 wt. % of magnesium hydroxide particles.

The amounts of charged fibrous basic magnesium sulfate particles and magnesium hydroxide particles as well as their yields in Example 1 are set forth in Table 1. In Table 1, the charged amount of fibrous basic magnesium sulfate particles means the amount of the seed particles supplied into the reaction vessel. The charged amount of magnesium hydroxide particles means the amount supplied to the reaction vessel. The yields of fibrous basic magnesium sulfate particles and magnesium hydroxide particles mean total amounts of the amount contained in the recovered solid content and the amount contained in the aqueous dispersion contained in the reaction vessel, which were determined at the time of terminating their supply.

TABLE 1

|  | Fibrous basic magnesium sulfate particles (g) | Magnesium hydroxide particles (g) |
| --- | --- | --- |
| Charged amount | 52.4 | 86.2 |
| Yield | 167.9 | 2.6 |

As is apparent from Table 1, the amount of fibrous basic magnesium sulfate particles produced by the reaction of magnesium hydroxide particles and magnesium sulfate was 115.5 g (167.9 g-52.4 g).

Example 2

The procedures of Example 1 were repeated to produce fibrous basic magnesium sulfate particles, except that the recovered aqueous magnesium sulfate solution stored in the tank 13 in the step (6), water in the tank 5, an aqueous magnesium sulfate solution stored in the tank 4 and a magnesium hydroxide particle-containing dispersion in the tank 3 were supplied in the step (5) to prepare an aqueous magnesium sulfate solution having a magnesium sulfate concentration of 20.1 wt. % and a magnesium hydroxide particle content of 2.0 wt. %. In the procedure, the feed ratio of the recovered aqueous magnesium sulfate solution from the tank 13 and the aqueous magnesium sulfate solution from the tank 4 was so adjusted that the recovered aqueous magnesium sulfate solution was supplied from the tank 13 in an amount of 90 wt. % and the aqueous magnesium sulfate solution was supplied from the tank 4 in an amount of 10 wt. %.

There was obtained fibrous magnesium sulfate particles having a mean thickness of 0.4 μm and a mean length of 23.4 μm which had essentially the same shapes as those obtained in Example 1.

The amounts of charged fibrous basic magnesium sulfate particles and magnesium hydroxide particles as well as their yields in Example 2 are set forth in Table 2.

TABLE 2

|  | Fibrous basic magnesium sulfate particles (g) | Magnesium hydroxide particles (g) |
| --- | --- | --- |
| Charged amount | 52.4 | 86.2 |
| Yield | 177.0 | 2.6 |

As is seen in Table 2, the amount of the produced fibrous basic magnesium sulfate particles was 124.6 g.

Therefore, the amount of the produced fibrous basic magnesium sulfate particles was essentially equal to that of Example 1.

BRIEF DESCRIPTION OF DRAWINGS

FIG. 1 (FIGURE) illustrates an apparatus which is considered to be employable for performing the process of the invention for production of fibrous basic magnesium sulfate particles in industry.

1: Tank for storing seed particle-containing aqueous dispersion
2: Pump
3: Tank for storing magnesium hydroxide
4: Tank for storing aqueous magnesium sulfate solution
5: Tank for storing water
6: Blending tank
7: Volumetric feeding pump
8: Reaction vessel
9: Stirring apparatus
10: Heating jacket
11: Tank for storing reaction product
12: Solid-liquid separation apparatus
13: Tank for storing recovered aqueous magnesium sulfate solution

What is claimed is:
1. A process for producing continuously fibrous basic magnesium particles which comprises the steps of:
(1) providing in a reaction vessel a seed particle-containing aqueous dispersion comprising fibrous basic magnesium sulfate seed particles dispersed in an aqueous medium;
(2) supplying magnesium hydroxide and magnesium sulfate continuously into the reaction vessel under heating and stirring the seed particle-containing aqueous dispersion, whereby depositing basic magnesium sulfate produced by the reaction between the magnesium sulfate and magnesium hydroxide in the presence of water on the surfaces of the fibrous basic magnesium sulfate seed particles, to give an aqueous dispersion containing an increased amount of fibrous basic magnesium sulfate particles;
(3) taking the aqueous dispersion obtained in the step (2) continuously out of the reaction vessel; and
(4) recovering fibrous basic magnesium sulfate particles from the aqueous dispersion taken out of the reaction vessel.
2. The process of claim 1, wherein the aqueous medium of the seed particle-containing aqueous dispersion used in the step (1) is an aqueous magnesium sulfate solution containing 1 to 40 wt. % of magnesium sulfate.
3. The process of claim 1, wherein the fibrous basic magnesium seed particles used in the step (1) have a mean thickness in the range of 0.1 to 1.0 μm and a mean length in the range of 8 to 30 μm.

4. The process of claim 1, wherein the magnesium hydroxide supplied into the reaction vessel in the step (2) is in the form of particles having a mean particle size in the range of 0.01 to 100 μm.

5. The process of claim 4, wherein the magnesium hydroxide particles are supplied in the step (2) under such conditions that the amount of the magnesium hydroxide particles in the aqueous dispersion is kept in the range of 0.05 to 20 wt. % based on the total amount of the magnesium hydroxide particles and fibrous basic magnesium sulfate particles in the aqueous dispersion.

6. The process of claim 1, wherein the magnesium sulfate is supplied into the reaction vessel in the step (2) in the form of an aqueous solution containing 1 to 40 wt. % of magnesium sulfate.

7. The process of claim 1, wherein the magnesium hydroxide and magnesium sulfate are supplied into the reaction vessel in the step (2) in such condition that the magnesium sulfate is supplied in an amount of 0.2 to 100 mols, per one mol of the magnesium hydroxide.

8. The process of claim 1, wherein the seed particle-containing aqueous dispersion is heated in the step (2) at a temperature not lower than 90° C.

9. The process of claim 1, wherein a liquid portion obtained by the recovery of the fibrous basic magnesium sulfate particles from the aqueous dispersion in the step (4) is supplied into the seed particle-containing aqueous dispersion used in the step (1).

* * * * *